(12) United States Patent
Stenneth et al.

(10) Patent No.: US 12,337,621 B2
(45) Date of Patent: Jun. 24, 2025

(54) APPARATUS AND METHODS FOR PROVIDING TIRE PRESSURE ANALYSIS

(71) Applicant: HERE GLOBAL B.V., Eindhoven (NL)

(72) Inventors: Leon Stenneth, Chicago, IL (US); Amarnath Nayak, Mumbai (IN); Alex Averbuch, Buffalo Grove, IL (US)

(73) Assignee: HERE GLOBAL B.V., Eindhoven (NL)

( * ) Notice: Subject to any disclaimer, the term of this patent is extended or adjusted under 35 U.S.C. 154(b) by 466 days.

(21) Appl. No.: 17/543,151

(22) Filed: Dec. 6, 2021

(65) Prior Publication Data

US 2023/0173856 A1 Jun. 8, 2023

(51) Int. Cl.
*B60C 23/04* (2006.01)
*G06N 20/00* (2019.01)

(52) U.S. Cl.
CPC ......... *B60C 23/0408* (2013.01); *G06N 20/00* (2019.01)

(58) Field of Classification Search
CPC .. B60C 23/0408; B60C 23/0479; G06N 20/00
See application file for complete search history.

(56) References Cited

U.S. PATENT DOCUMENTS

| 11,080,949 | B1* | 8/2021 | Just | B60C 23/02 |
|---|---|---|---|---|
| 2011/0314331 | A1 | 12/2011 | Beach et al. | |
| 2014/0277910 | A1* | 9/2014 | Suh | B60C 23/0476 701/33.9 |
| 2015/0239307 | A1* | 8/2015 | Horikoshi | B60C 23/0477 340/442 |
| 2021/0056778 | A1* | 2/2021 | Wylie | G07C 5/0816 |
| 2021/0125428 | A1* | 4/2021 | Tedesco | G07C 5/0808 |
| 2021/0181737 | A1* | 6/2021 | Patnaik | G05D 1/0231 |

* cited by examiner

*Primary Examiner* — Aniss Chad
*Assistant Examiner* — Nikki Marie M Molina
(74) *Attorney, Agent, or Firm* — Peter H. Yu; HERE GLOBAL B.V.

(57) ABSTRACT

An apparatus, method and computer program product are provided for providing a tire pressure analysis. In one example, the apparatus receives first sensor data indicating a first tire pressure change associated with a first vehicle and causes a prediction model to generate a predicted cause of the first tire pressure change based on the first sensor data. The prediction model is trained based on historical data, the historical data defining a plurality of tire pressure signatures. Each of the plurality of tire pressure signatures correlates a cause of a second tire pressure change associated with a second vehicle to second sensor data indicating one or more tire pressure levels of the second vehicle over a period in which a wheel of the second vehicle completes a revolution. The apparatus further causes a notification of the predicted cause at a user interface associated with the first vehicle.

12 Claims, 10 Drawing Sheets

APPARATUS AND METHODS FOR PROVIDING TIRE PRESSURE ANALYSIS

TECHNICAL FIELD

The present disclosure generally relates to the field of monitoring vehicle sensor data, associated methods and apparatus, and in particular, concerns, for example, an apparatus configured to provide an analysis associated with a tire pressure change, such as an analysis indicating a predicted cause of the tire pressure change.

BACKGROUND

Modern vehicles are equipped with a system for acquiring various sensor data, such as tire pressure data. Such system may include a user interface and tire pressure sensors for detecting and notifying a detection of a tire pressure change. Generally, the system is limited to the application of detecting and notifying a tire pressure loss. As such, when a vehicle is taken to an auto repair shop for repair, a mechanic is required to manually detect a cause of the tire pressure loss and the source thereof, thereby increasing the time/cost of manual labour.

The listing or discussion of a prior-published document or any background in this specification should not necessarily be taken as an acknowledgement that the document or background is part of the state of the art or is common general knowledge.

BRIEF SUMMARY

According to a first aspect, an apparatus comprising at least one processor and at least one non-transitory memory including computer program code instructions is described. The computer program code instructions, when executed, cause the apparatus to receive historical data, the historical data defining a plurality of tire pressure signatures, wherein each of the plurality of tire pressure signatures correlates a cause of a first tire pressure change associated with a first vehicle to sensor data indicating one or more tire pressure levels of the first vehicle over a period in which a wheel of the first vehicle completes a revolution, and based on the historical data, train a prediction model to generate a predicted cause of a second tire pressure change associated with a second vehicle.

According to a second aspect, a non-transitory computer-readable storage medium having computer program code instructions stored therein is described. The computer program code instructions, when executed by at least one processor, cause the at least one processor to receive first sensor data indicating a first tire pressure change associated with a first vehicle, cause a prediction model to generate a predicted cause of the first tire pressure change based on the first sensor data, wherein the prediction model is trained based on historical data, the historical data defining a plurality of tire pressure signatures, wherein each of the plurality of tire pressure signatures correlates a cause of a second tire pressure change associated with a second vehicle to second sensor data indicating one or more tire pressure levels of the second vehicle over a period in which a wheel of the second vehicle completes a revolution, and cause a notification of the predicted cause at a user interface associated with the first vehicle.

According to a third aspect, a method of determining a predicted cause of a first tire pressure change is described. The method includes receiving first sensor data indicating the first tire pressure change and first travel data associated with the first tire pressure change. The method further includes identifying a past event corresponding to the first sensor data and the first travel data, wherein the past event correlates a cause of a second tire pressure change to second sensor data indicating the second tire pressure change and second travel data. The method further includes determining the predicted cause based at least in part on the past event.

Also, a computer program product may be provided. For example, a computer program product includes instructions which, when the program is executed by a computer, cause the computer to carry out the steps described herein.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

The steps of any method disclosed herein do not have to be performed in the exact order disclosed, unless explicitly stated or understood by the skilled person.

Corresponding computer programs (which may or may not be recorded on a carrier) for implementing one or more of the methods disclosed herein are also within the present disclosure and encompassed by one or more of the described example embodiments.

The present disclosure includes one or more corresponding aspects, example embodiments or features in isolation or in various combinations whether or not specifically stated (including claimed) in that combination or in isolation. Corresponding means for performing one or more of the discussed functions are also within the present disclosure.

BRIEF DESCRIPTION OF THE DRAWINGS

The embodiments of the invention are illustrated by way of example, and not by way of limitation, in the figures of the accompanying drawings.

DETAILED DESCRIPTION

Modern vehicles are equipped with a tire pressure monitoring system (TPMS) for monitoring tire pressure levels of a vehicle and alerting a user in response to one or more of the tire pressure levels falling below a threshold. One type of TPMS includes a sensor mounted in a wheel to measure air pressure in each tire. When the air pressure drops below, for example, 25 percent, the sensor transmits a flag to the vehicle's on-board computing platform, and in response, the on-board computing platform triggers a dashboard indicator light. Another type of TPMS integrates Antilock Braking System's (ABS) wheel speed sensors. If a tire pressure is at a "low" level, the wheel speed sensors determine a rotation of a tire at a different wheel speed than other tires. Such information is detected by the on-board computing platform, and in response, the on-board computing platform triggers the dashboard indicator light. Generally, applications of the TPMS are limited to detecting and notifying the tire pressure loss. As such, when a vehicle is taken to an auto repair shop, a mechanic is required to manually detect the cause of the tire pressure loss and the source thereof, thereby increasing the time/cost of manual labour. Additionally, once the TPMS detects a tire pressure loss, a user of the vehicle may be inclined to stop the vehicle since the user is not aware of a maximum amount of distance that the vehicle can safely travel. There will now be described an apparatus and associated methods that may address these issues.

Figure 1:
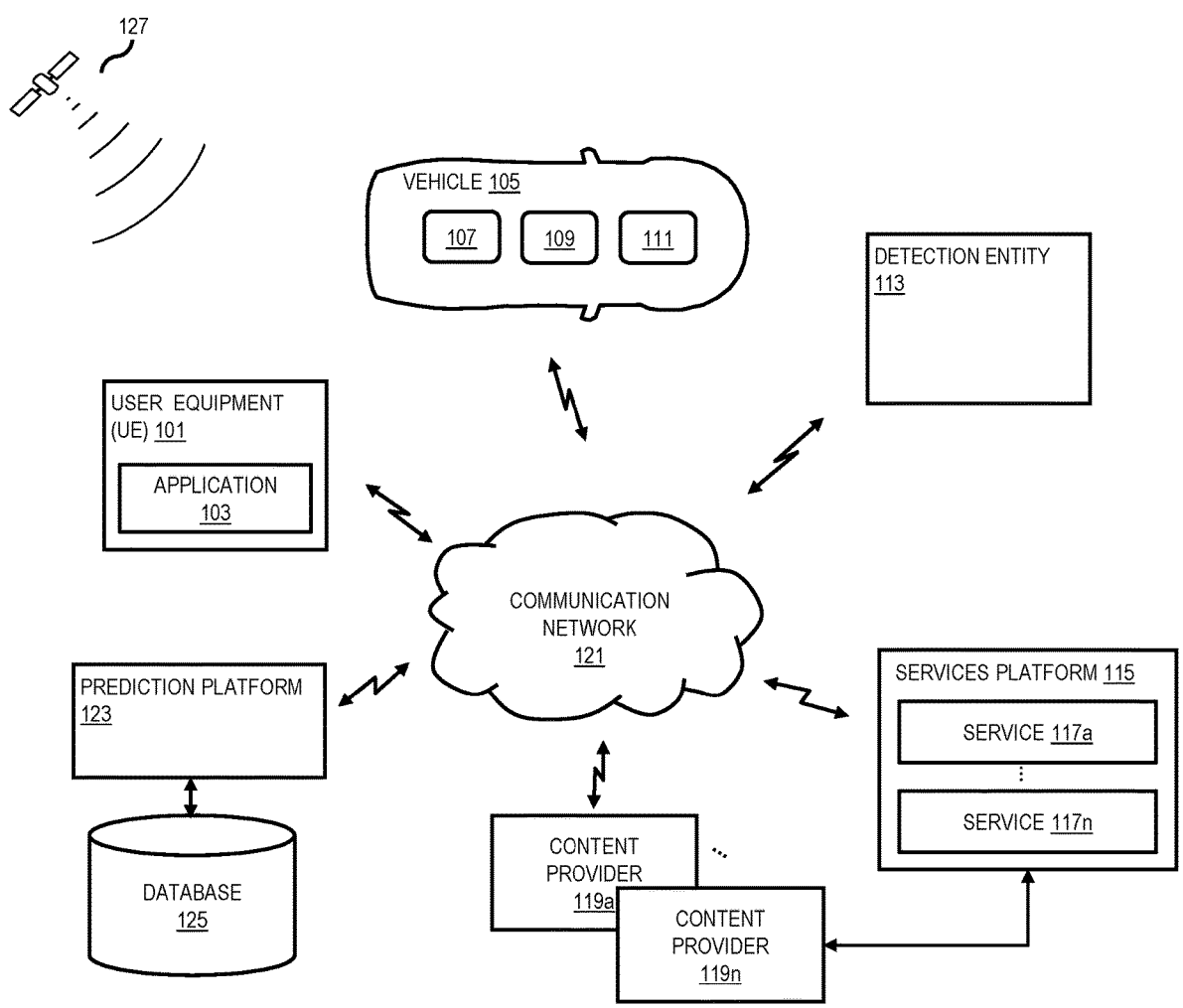
FIG. 1 illustrates a diagram of a system capable of providing a tire pressure analysis.

FIG. 1 is a diagram of a system 100 capable of providing a tire pressure analysis, according to one embodiment. The tire pressure analysis may refer to a process of rendering: (1) a prediction for a cause of a tire pressure change; (2) a prediction of a tire pressure change associated with one or more road segments; (3) an estimation of a maximum distance a vehicle can safely travel after detecting the tire pressure change; (4) a determination of a route to a destination that yields a minimum amount of tire pressure loss after detecting the tire pressure change; or (5) a combination thereof. The system includes a user equipment (UE) 101, a vehicle 105, a detection entity 113, a services platform 115, content providers 119a-119n, a communication network 121, a prediction platform 123, a database 125, and a satellite 127. Additional or a plurality of mentioned components may be provided.

In the illustrated embodiment, the system 100 comprises a user equipment (UE) 101 that may include or be associated with an application 103. In one embodiment, the UE 101 has connectivity to the prediction platform 123 via the communication network 121. The prediction platform 123 performs one or more functions associated with providing a tire pressure analysis and providing a response to the tire pressure analysis. In the illustrated embodiment, the UE 101 may be any type of mobile terminal or fixed terminal such as a mobile handset, station, unit, device, multimedia computer, multimedia tablet, Internet node, communicator, desktop computer, laptop computer, notebook computer, netbook computer, tablet computer, personal communication system (PCS) device, personal digital assistants (PDAs), audio/video player, digital camera/camcorder, positioning device, fitness device, television receiver, radio broadcast receiver, electronic book device, game device, devices associated with or integrated with one or more vehicles (including the vehicle 105), or any combination thereof, including the accessories and peripherals of these devices. In one embodiment, the UE 101 can be an in-vehicle navigation system, a personal navigation device (PND), a portable navigation device, a cellular telephone, a mobile phone, a personal digital assistant (PDA), a watch, a camera, a computer, and/or other device that can perform navigation-related functions, such as digital routing and map display. In one embodiment, the UE 101 can be a cellular telephone. A user may use the UE 101 for navigation functions, for example, road link map updates. It should be appreciated that the UE 101 can support any type of interface to the user (such as "wearable" devices, etc.). In one embodiment, the one or more vehicles may have cellular or Wi-Fi connection either through the inbuilt communication equipment or from the UE 101 associated with the vehicles. The application 103 may assist in conveying information regarding at least one attribute associated with a road segment via the communication network 121. In one embodiment, the information may indicate a tire pressure analysis.

In the illustrated embodiment, the application 103 may be any type of application that is executable by the UE 101, such as a mapping application, a location-based service application, a navigation application, a content provisioning service, a camera/imaging application, a media player application, a social networking application, a calendar application, or any combination thereof. In one embodiment, one of the applications 103 at the UE 101 may act as a client for the prediction platform 123 and perform one or more functions associated with the functions of the prediction platform 123 by interacting with the prediction platform 123 over the communication network 121. The application 103 may provide the tire pressure analysis and/or be executed via the UE 101 to receive information needed for performing the tire pressure analysis (e.g., a desired destination subsequent to detecting a tire pressure change).

The vehicle 105 may be a standard gasoline powered vehicle, a hybrid vehicle, an electric vehicle, a fuel cell vehicle, and/or any other mobility implement type of vehicle. The vehicle 105 includes parts related to mobility, such as a powertrain with an engine, a transmission, a suspension, a driveshaft, and/or wheels, etc. The vehicle 105 may be a non-autonomous vehicle or an autonomous vehicle. The term autonomous vehicle may refer to a self-driving or driverless mode in which no passengers are required to be on board to operate the vehicle. An autonomous vehicle may be referred to as a robot vehicle or an automated vehicle. The autonomous vehicle may include passengers, but no driver is necessary. These autonomous vehicles may park themselves or move cargo between locations without a human operator. Autonomous vehicles may include multiple modes and transition between the modes. The autonomous vehicle may steer, brake, or accelerate the vehicle based on the position of the vehicle, and may respond to lane marking indicators (lane marking type, lane marking intensity, lane marking color, lane marking offset, lane marking width, or other characteristics) and driving commands or navigation commands. In one embodiment, the vehicle 105 may be assigned with an autonomous level. An autonomous level of a vehicle can be a Level 0 autonomous level that corresponds to a negligible automation for the vehicle, a Level 1 autonomous level that corresponds to a certain degree of driver assistance for the vehicle 105, a Level 2 autonomous level that corresponds to partial automation for the vehicle, a Level 3 autonomous level that corresponds to conditional automation for the vehicle, a Level 4 autonomous level that corresponds to high automation for the vehicle, a Level 5 autonomous level that corresponds to full automation for the vehicle, and/or another sub-level associated with a degree of autonomous driving for the vehicle.

In one embodiment, the UE 101 may be integrated in the vehicle. An assisted driving device may be included in the vehicle 105. The assisted driving device may include memory, a processor, and systems to communicate with the UE 101. In one embodiment, the vehicle 105 may be an HAD vehicle or an ADAS vehicle. An HAD vehicle may refer to a vehicle that does not completely replace the human operator. Instead, in a highly assisted driving mode, a vehicle may perform some driving functions and the human operator may perform some driving functions. Such vehicle may also be driven in a manual mode in which the human operator exercises a degree of control over the movement of the vehicle. The vehicle 105 may also include a completely driverless mode. The HAD vehicle may control the vehicle through steering or braking and may respond to lane marking indicators (lane marking type, lane marking intensity, lane marking color, lane marking offset, lane marking width, or other characteristics) and driving commands or navigation commands. Similarly, ADAS vehicles include one or more partially automated systems in which the vehicle alerts the driver. The features are designed to avoid collisions automatically. Features may include adaptive cruise control, braking, or steering adjustments to keep the driver in the correct lane. ADAS vehicles may issue warnings for the driver based on the position of the vehicle or based on the lane marking indicators (lane marking type, lane marking intensity, lane marking color, lane marking offset, lane marking width, or other characteristics) and driving commands or navigation commands.

In this illustrated example, the vehicle 105 includes a plurality of sensors 107, an on-board computing platform 109, and an on-board communication platform 111. The sensors 107 may include one or more sensors for monitoring tire pressure levels of one or more tires of the vehicle 105. Such sensors and a combination of one or more processors, one or more memory devices, and/or other electronic devices may define a TPMS. By way of example, a direct TPMS may include a battery, a housing, a PCB, a pressure sensor, an analog-digital converter, a microcontroller, a system controller, an oscillator, a radio frequency transmitter, a low frequency receiver, and a voltage regulator. A TPMS may be an electronic system configured to monitor air pressure inside pneumatic tires of a vehicle. The TPMS may report real-time tire-pressure information to a user of the vehicle, either via a gauge, a pictogram display, a simple low-pressure warning light, and/or other types of user interface. TPMS can be divided into two different types-direct (dTPMS) and indirect (iTPMS). The dTPMS directly measures tire pressure using hardware sensors. For example, in the dTPMS, a battery-driven pressure sensor may be mounted inside a valve of each wheel, and said sensor transfers pressure information to the on-board computing platform 109. In one embodiment, one or more sensors of the dTPMS may also measure and alert temperature levels of the tire. In one embodiment, one or more sensors of the dTPMS may utilize a wireless power system. The iTPMS does not use physical pressure sensors but measure air pressures using software-based systems which evaluates existing sensor signals like wheel speeds, accelerometers, driveline data, etc. One type of iTPMS systems is based on the principle that under-inflated tires have a slightly smaller diameter (and hence higher angular velocity) than a correctly inflated one. These differences are measurable through the wheel speed sensors of ABS/ESC systems. Another type of iTPMS can also detect simultaneous under-inflation using spectrum analysis of individual wheels, which can be realized in software using advanced signal processing techniques. The sensors 107 may also include other types of sensors, such as image sensors (e.g., electronic imaging devices of both analog and digital types, which include digital cameras, camera modules, camera phones, thermal imaging devices, radar, sonar, lidar, etc.), a global positioning sensor for gathering location data, a network detection sensor for detecting wireless signals or receivers for different short-range communications (e.g., Bluetooth, Wi-Fi, Li-Fi, near field communication (NFC), etc.), temporal information sensors, an audio recorder for gathering audio data, velocity sensors, light sensors, orientation sensors augmented with height sensor and acceleration sensor, tilt sensors to detect the degree of incline or decline of the vehicle 105 along a path of travel, etc. In a further embodiment, sensors about the perimeter of the vehicle 105 may detect the relative distance of the vehicle 105 from road objects (e.g., road markings), lanes, or roadways, the presence of other vehicles, pedestrians, traffic lights, road objects, road features (e.g., curves) and any other objects, or a combination thereof. In one embodiment, the vehicle 105 may include GPS receivers to obtain geographic coordinates from satellites 127 for determining current location and time associated with the vehicle 105. Further, the location can be determined by a triangulation system such as A-GPS, Cell of Origin, or other location extrapolation technologies.

The on-board computing platform 109 performs one or more functions associated with the vehicle 105. In one embodiment, the on-board computing platform 109 may aggregate sensor data generated by at least one of the sensors 107 and transmit the sensor data via the on-board communications platform 111. The on-board computing platform 109 may receive control signals for performing one or more of the functions from the prediction platform 123, the UE 101, the services platform 115, one or more of the content providers 119a-119n, or a combination thereof via the on-board communication platform 111. The on-board computing platform 109 includes at least one processor or controller and memory (not illustrated). The processor or controller may be any suitable processing device or set of processing devices such as, but not limited to: a microprocessor, a microcontroller-based platform, a suitable integrated circuit, one or more field programmable gate arrays (FPGAs), and/or one or more application-specific integrated circuits (ASICs). The memory may be volatile memory (e.g., RAM, which can include non-volatile RAM, magnetic RAM, ferroelectric RAM, and any other suitable forms); non-volatile memory (e.g., disk memory, FLASH memory, EPROMs, EEPROMs, non-volatile solid-state memory, etc.), unalterable memory (e.g., EPROMs), read-only memory, and/or high-capacity storage devices (e.g., hard drives, solid state drives, etc). In some examples, the memory includes multiple kinds of memory, particularly volatile memory and non-volatile memory.

The on-board communications platform 109 includes wired or wireless network interfaces to enable communication with external networks. The on-board communications platform 109 also includes hardware (e.g., processors, memory, storage, antenna, etc.) and software to control the wired or wireless network interfaces. In the illustrated example, the on-board communications platform 109 includes one or more communication controllers (not illustrated) for standards-based networks (e.g., Global System for Mobile Communications (GSM), Universal Mobile Telecommunications System (UMTS), Long Term Evolution (LTE) networks, 5G networks, Code Division Multiple Access (CDMA), WiMAX (IEEE 802.16m); Near Field Communication (NFC); local area wireless network (including IEEE 802.11 a/b/g/n/ac or others), dedicated short range communication (DSRC), and Wireless Gigabit (IEEE 802.11ad), etc.). In some examples, the on-board communications platform 109 includes a wired or wireless interface (e.g., an auxiliary port, a Universal Serial Bus (USB) port, a Bluetooth® wireless node, etc.) to communicatively couple with the UE 101.

The detection entity 113 may be another vehicle, a drone, a road-side sensor (e.g., a sensor installed within a road pavement), or a device mounted on a stationary object within or proximate to a road segment (e.g., a traffic light post, a sign post, a post, a building, etc.). The detection entity 113 may be equipped with image sensors (e.g., electronic imaging devices of both analog and digital types, which include digital cameras, camera modules, camera phones, thermal imaging devices, radar, sonar, lidar, etc.), light sensors (e.g., photodetectors), temperature sensors, audio recorder for gathering audio data, velocity sensors, oriental sensors augmented with height sensor and acceleration sensor, tilt sensors, etc. In a further embodiment, sensors about the perimeter of the detection entity 113 may detect the relative distance thereof from road objects (e.g., road markings), lanes, or roadways, the presence of other vehicles, pedestrians, traffic lights, road objects, road features (e.g., curves) and any other objects, or a combination thereof. In one embodiment, the detection entity 113 may include GPS receivers to obtain geographic coordinates from satellites 127 for determining current location and time associated with at which the detection entity 113 acquires sensor data. The location can be determined by a triangulation system such as A-GPS, Cell of Origin, or other location extrapolation technologies. In one embodiment, if the detection entity 113 is a stationary device (e.g., a traffic camera), the detection entity 113 may store contextual information indicating a location at which the detection entity 113 is located, a direction at which a particular sensor (e.g., an image sensor) of the detection entity 113 is facing, or a combination thereof. In one embodiment, the detection entity 113 may be a mobile device (e.g., similar to the UE 101) and may be equipped with any of the aforementioned sensors. Such mobile device may be capable of providing images and information indicating a time, location, and orientation at which the images are acquired.

The communication network 121 of system 100 includes one or more networks such as a data network, a wireless network, a telephony network, or any combination thereof. The data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, 5G networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

The service platform 115 may be an original equipment manufacturer (OEM) platform that provides one or more services 117a-117n (collectively referred to as services 117). In one embodiment the one or more service 117 may be sensor data collection services. By way of example, vehicle sensor data provided by the sensors 107 may be transferred to the UE 101, the prediction platform 123, the database 125, or other entities communicatively coupled to the communication network 121 through the service platform 115. The services 117 may also be other third-party services and include mapping services, navigation services, travel planning services, weather-based services, notification services, social networking services, content (e.g., audio, video, images, etc.) provisioning services, application services, storage services, contextual information determination services, location-based services, information-based services, etc. In one embodiment, the services platform 115 uses the output data generated by the prediction platform 123 to provide services such as navigation, mapping, other location-based services, etc.

In one embodiment, the content providers 119a-119n (collectively referred to as content providers 119) may provide content or data (e.g., including geographic data, parametric representations of mapped features, etc.) to the UE 101, the vehicle 105, services platform 115, the vehicle 105, the database 125, the prediction platform 123, or the combination thereof. The content provided may be any type of content, such as map content, textual content, audio content, video content, image content, etc. In one embodiment, the content providers 119 may provide content that may aid in providing a tire pressure analysis, and/or other related characteristics. In one embodiment, the content providers 119 may also store content associated with the UE 101, the vehicle 105, services platform 115, the vehicle 105, the database 125, the prediction platform 123, or the combination thereof. In another embodiment, the content providers 119 may manage access to a central repository of data, and offer a consistent, standard interface to data, such as a repository of the database 125.

In the illustrated embodiment, the prediction platform 123 may be a platform with multiple interconnected components. The prediction platform 123 may include multiple servers, intelligent networking devices, computing devices, components and corresponding software for providing a tire pressure analysis. It should be appreciated that that the prediction platform 123 may be a separate entity of the system 100, included within the UE 101 (e.g., as part of the applications 103), included within the vehicle 105 (e.g., as part of an application stored in memory of the on-board computing platform 109), included within the services platform 115 (e.g., as part of an application stored in server memory for the services platform 115), or a combination thereof.

The prediction platform 123 is capable of providing a tire pressure analysis and providing information and/or a response associated with the tire pressure analysis. The tire pressure analysis may refer to a process of rendering: (1) a prediction for a cause of a tire pressure change; (2) a prediction of a tire pressure change associated with one or more road segments; (3) an estimation of a maximum distance a vehicle can safely travel after detecting the tire pressure change; (4) a determination of a route to a destination that yields a minimum amount of tire pressure loss after detecting the tire pressure change; or (5) a combination thereof.

The prediction platform 123 may embody a machine learning model for rendering a prediction for a cause of a tire pressure change. The machine learning model may be trained based on historical data including a plurality of tire pressure signatures. Each of the plurality of tire pressure signatures may include: (1) sensor data associated with a tire pressure change; (2) travel data of a vehicle impacted by the tire pressure change; (3) vehicle attribute data indicating one or more attributes of the vehicle impacted by the tire pressure change; (4) or a combination thereof. The sensor data may indicate one or more tire pressure levels of one or more tires of the vehicle over a predetermined period. The predetermined period may define: (1) a total amount of time elapsed for the vehicle to travel a route in which the vehicle was impacted by the tire pressure change; (2) an amount of time less than the total amount but including a period in which the vehicle was impacted by the tire pressure change; (3) the period in which the vehicle was impacted by the tire pressure change; (4) one or more lesser periods within the period in which the vehicle was impacted by the tire pressure change; or (5) a period in which a wheel of the vehicle completes a revolution and the vehicle was impacted by the tire pressure change. The sensor data may represent the one or more tire pressure levels as a function of time (e.g., tire pressure loss per minute, per second, per milli-second, etc.). The sensor data may also indicate: (1) one or more speed levels of the vehicle within the predetermined period; (2) one or more ambient temperature levels of the vehicle within the predetermined period; (3) one or more internal temperature levels of one or more tires of the vehicle within the predetermined period; (4) an amount of time elapsed starting from a time point of the latest installment of a tire to the start of the predetermined period; (5) a total amount of distance travelled by the vehicle; (6) a total amount of distance travelled by the vehicle since the latest installment of a tire; or (7) a combination thereof. Generally, the sensor data may be acquired from the vehicle; however, certain sensor data, such as a speed of the vehicle, may be acquired via one or more detection entities 113 that is proximate to the vehicle at a given time. The travel data may indicate: (1) one or more road segments in which the vehicle has travelled within the predetermined period; (2) one or more road attributes of the one or more road segments; (3) one or more weather conditions that has impacted the one or more road segment; (4) whether one or more road events (e.g., road works, road accident, etc.) was impacting the one or more road segments; (5) a degree of traffic impacting the one or more road segments; (6) a season in which the predetermined period occurs; (7) a date in which the predetermined period occurs; or (8) a combination thereof. The vehicle attribute data may indicate: (1) a size of the vehicle; (2) a weight of the vehicle; (3) a make and/or model of the vehicle; (4) a classification of the vehicle; (5) a type of tire equipped by the vehicle; (6) one or more specifications associated with the vehicle or one or more functions thereof; or (7) a combination thereof. The travel data and the vehicle attribute data may be acquired from the vehicle, one or more detection entities 113 (such as a system that can identify vehicles and classify the vehicles to acquire attributes associated with the vehicles), the services platform 115, one or more content providers 119, the database 125, or a combination thereof.

Each of the plurality of tire pressure signatures may further include correlation data that correlate the sensor data, the travel data, the vehicle attribute data, or the combination thereof to ground truth data indicating a cause of the tire pressure change associated with one or more tires of the vehicle. The ground truth data may be recorded based on an actual observation of a cause of the tire pressure change. For example, a mechanic may review the state of a tire and record the ground truth data. The cause of the tire pressure change may indicate a direct source causing the tire pressure change (e.g., an issue within a tire, a rim, or a valve) and a location of a source with respect to a wheel that is causing the tire pressure change. For each of the plurality of tire pressure signatures, one or more pressure levels may be generated over the predetermined period to uniquely define said tire pressure signature and a cause associated therewith. As such, a cause indicated by a tire pressure signature may indicate: (1) a nail or metal penetrating a tire; (2) a damaged rim; (3) a defective valve; (4) an incorrect seating of a valve within a rim; (5) an over-tightened electronic sensor cap (e.g., ignoring a proper torque thereof at approximately 4 Nm); (6) an unsealed inner layer protecting a tire (e.g., a micro-crack); (7) a damaged tire bead during installation or removal of a product on a rim; (8) dirt within a contact point of a tire bead and a flange of the rim; (9) a temperature drop in a cold weather; or (10) small punctures or cuts within the tire.

Once the machine learning model is trained, the prediction platform 123 may render a prediction of a cause for a tire pressure change in response to receiving a request from the vehicle 105. The vehicle 105 may transmit the request to the prediction platform 123 when a rate at which a tire pressure changes satisfies a threshold rate. In one embodiment, the vehicle 105 may transmit the request when a tire pressure drops more than 5 percent of the maximum tire pressure of a wheel. To render the prediction, the prediction platform 123 may require at least sensor data indicating all tire pressure levels recorded over a period in which a wheel of the vehicle 105 completes a revolution (will be referred as a revolution period, herein). The revolution period may be calculated by the prediction platform 123 as a function of a speed of the vehicle 105 and the vehicle attribute data indicating a circumference of a wheel. In one embodiment, the prediction platform 123 may analyze one or more pressure levels within a revolution period following a duration in which the tire pressure change is detected. In one embodiment, if the duration in which the tire pressure change is detected is greater than a revolution period, the prediction platform 123 may analyze one or more pressure levels of a period within said duration. In one embodiment, the prediction platform 123 may acquire a plurality of pressure levels over a plurality of revolution periods and determine an average for a single revolution period. The prediction platform 123 may analyze one or more pressure levels over the revolution period to derive a pattern and/or a rate of change over the revolution period. Subsequently, the prediction platform 123 may identify a tire pressure signature and a cause thereof that correspond to the derived pattern and/or rate of change. In one embodiment, the prediction platform 123 may normalize sensor data acquired during the revolution period to identify a tire pressure signature corresponding to the derived pattern and/or rate of change. For example, tire pressure levels acquired during the revolution period may be normalized based on ambient temperature levels, road pavement temperature levels, atmospheric temperature levels, or a combination thereof. If the tire pressure signature is identified, the prediction platform 123 may further identify a location of a source within a wheel of the vehicle 105 that is causing the tire pressure change. In one embodiment, the prediction platform 123 may provide a confidence at which the derived pattern and/or rate of change indicate a predicted cause of an identified tire pressure signature and a predicted location of a source of the predicted cause. In one embodiment, the prediction platform 123 may further acquire travel data and/or vehicle attribute data associated with the vehicle 105 and use the travel data and/or the vehicle attribute data to facilitate a search for at least one tire pressure signature that corresponds to the derived pattern and/or rate of change.

In one embodiment, the machine learning model may be further trained to predict a tire pressure change associated with one or more road segments based on sensor data associated with a vehicle's tire pressure change, travel data associated with the vehicle, vehicle attribute data thereof, or a combination thereof. By way of example, the machine learning model is trained to learn one or more tire pressure levels of a type of vehicle that has moved at a certain speed with a type of tire of a certain age at a road segment having certain attributes (e.g., composition of the surface thereof) and impacted by a certain weather condition. Once the machine learning model is trained and the prediction platform 123 detects that the vehicle 105 is experiencing a tire pressure change, the prediction platform 123 uses the machine learning model to predict an amount of tire pressure loss associated with one or more road segments that the vehicle 105 is to traverse. In such embodiment, the machine learning model refers to past instances in which a similar vehicle with a similar tire type has traversed the one or more road segments (or similar road segments) and lost tire pressure. Based on such instances, the machine learning model may predict an amount of tire pressure lost for traversing the one or more road segments. In one embodiment, the prediction platform 123 may estimate an amount of tire pressure change based on a current rate at which the tire pressure of the vehicle 105 is changing. In one embodiment, the prediction platform 123 may estimate a maximum distance a vehicle can safely travel after detecting the tire pressure change. For example, the prediction platform 123 may determine that it is unsafe for a vehicle to travel once the tire pressure thereof falls below 25 percent of the maximum tire pressure capacity. In one embodiment, after detecting a tire pressure change, the prediction platform 123 may identify a destination (e.g., the nearest auto repair shop, home, dealership, etc.) and use the machine learning model to estimate a route to the destination that yields a minimum amount of tire pressure loss.

In one embodiment, after the prediction platform 123 renders a prediction for a cause of a tire pressure change, a wheel of the vehicle 105 may be inspected by a service personnel (e.g., a mechanic) to validate the actual cause of the tire pressure change. If the inspection validates the prediction, the service personnel may provide an input via the UE 101 to indicate that the prediction is true. Conversely, the service personnel may provide an input via the UE 101 to indicate that the prediction is false and provide the actual cause of the tire pressure change. In such embodiment, the prediction platform 123 may receive the input and use the input to further train the machine learning model.

In the illustrated embodiment, the database 125 stores information on road links (e.g., road length, road breadth, slope information, curvature information, etc.) and probe data for one or more road links (e.g., traffic density information). In one embodiment, the database 125 may include any multiple types of information that can provide means for aiding in providing a tire pressure analysis. It should be appreciated that the information stored in the database 125 may be acquired from any of the elements within the system 100, other vehicles, sensors, database, or a combination thereof.

In one embodiment, the UE 101, the vehicle 105, the detection entity 113, the services platform 115, the content providers 119, the prediction platform 123 communicate with each other and other components of the communication network 121 using well known, new or still developing protocols. In this context, a protocol includes a set of rules defining how the network nodes within the communication network 121 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically affected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2:
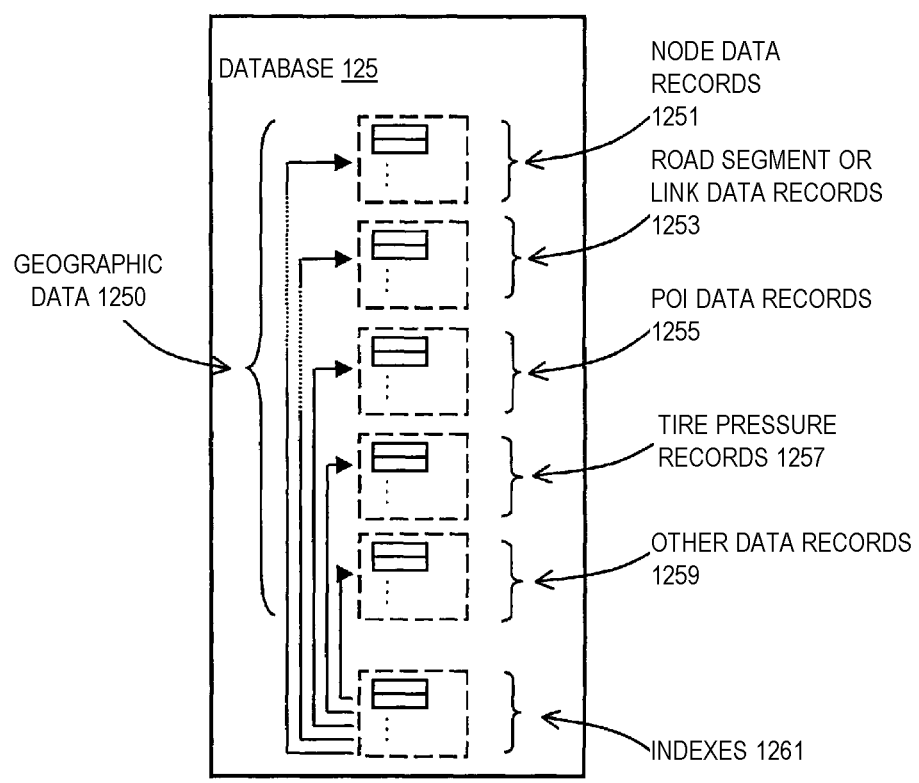
FIG. 2 illustrates a diagram of the database within the system of FIG. 1.

FIG. 2 is a diagram of a database 125 (e.g., a map database), according to one embodiment. In one embodiment, the database 125 includes geographic data 1250 used for (or configured to be compiled to be used for) mapping and/or navigation-related services. In one embodiment, the following terminology applies to the representation of geographic features in the database 125.

a. "Node"—A point that terminates a link.
  b. "road/line segment"—A straight line connecting two points.
  C. "Link" (or "edge")—A contiguous, non-branching string of one or more road segments terminating in a node at each end.

In one embodiment, the database 125 follows certain conventions. For example, links do not cross themselves and do not cross each other except at a node. Also, there are no duplicated shape points, nodes, or links. Two links that connect each other have a common node.

As shown, the database 125 includes node data records 1251, road segment or link data records 1253, point of interest (POI) data records 1255, tire pressure records 1257, other records 1259, and indexes 1261, for example. More, fewer or different data records can be provided. In one embodiment, additional data records (not shown) can include cartographic ("carto") data records, routing data, and maneuver data. In one embodiment, the indexes 1261 may improve the speed of data retrieval operations in the database 125. In one embodiment, the indexes 1261 may be used to quickly locate data without having to search every row in the database 125 every time it is accessed.

In exemplary embodiments, the road segment data records 1253 are links or segments representing roads, streets, or paths, as can be used in the calculated route or recorded route information for determination of one or more personalized routes. The node data records 1251 are end points (such as intersections) corresponding to the respective links or segments of the road segment data records 1253. The road link data records 1253 and the node data records 1251 represent a road network, such as used by vehicles, cars, and/or other entities. Alternatively, the database 125 can contain path segment and node data records or other data that represent pedestrian paths or areas in addition to or instead of the vehicle road record data, for example.

Links, segments, and nodes can be associated with attributes, such as geographic coordinates, a number of road objects (e.g., road markings, road signs, traffic light posts, etc.), types of road objects, traffic directions for one or more portions of the links, segments, and nodes, traffic history associated with the links, segments, and nodes, street names, address ranges, speed limits, turn restrictions at intersections, presence of roadworks, and other navigation related attributes, as well as POIs, such as gasoline stations, hotels, restaurants, museums, stadiums, offices, automobile dealerships, auto repair shops, buildings, stores, parks, etc. The database 125 can include data about the POIs and their respective locations in the POI data records 1255. The data about the POIs may include attribute data associated with the POIs. The attribute data may indicate a type of POI, a shape of POI, a dimension(s) of POI, a number of stories included in each of the POIs, etc. The database 125 can also include data about places, such as cities, towns, or other communities, and other geographic features, such as bodies of water, mountain ranges, etc. Such place or feature data can be part of the POI data records 1255 or can be associated with POIs or POI data records 1255 (such as a data point used for displaying or representing a position of a city).

The tire pressure records 1257 includes, for each of a plurality of road segments, historical data including sensor data of a vehicle impacted by a tire pressure change, travel data associated with the vehicle, and vehicle attribute data associated with the vehicle. The tire pressure records 1257 also includes tire pressure signatures, where each of the tire pressure signatures includes sensor data, travel data, vehicle attribute data, a cause of tire pressure change, and correlation data that correlate the cause to the sensor data, the travel data, the vehicle attribute data, or a combination thereof.

Other records 1259 may include computer code instructions and/or algorithms for executing a machine learning model that is capable of providing a tire pressure analysis. The other records 1259 may further include verification data indicating: (1) whether a verification of a prediction for a cause of a tire pressure was conducted; (2) whether the verification validates the prediction; (3) an actual cause of the tire pressure change; or (4) a combination thereof.

In one embodiment, the database 125 can be maintained by one or more of the content providers 119 in association with a map developer. The map developer can collect geographic data to generate and enhance the database 125. There can be different ways used by the map developer to collect data. These ways can include obtaining data from other sources, such as municipalities or respective geographic authorities. In addition, the map developer can employ field personnel to travel by vehicle along roads throughout the geographic region to observe attributes associated with one or more road segments and/or record information about them, for example. Also, remote sensing, such as aerial or satellite photography, can be used.

The database 125 can be a master database stored in a format that facilitates updating, maintenance, and development. For example, the master database or data in the master database can be in an Oracle spatial format or other spatial format (e.g., accommodating different map layers), such as for development or production purposes. The Oracle spatial format or development/production database can be compiled into a delivery format, such as a geographic data files (GDF) format. The data in the production and/or delivery formats can be compiled to form database products or databases, which can be used in end user navigation devices or systems.

For example, geographic data is compiled (such as into a platform specification format (PSF)) to organize and/or configure the data for performing navigation-related functions and/or services, such as route calculation, route guidance, map display, speed calculation, distance and travel time functions, and other functions, by a navigation device, such as by the vehicle 105, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received database in a delivery format to produce one or more compiled navigation databases.

The processes described herein for providing a tire pressure analysis may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 3:
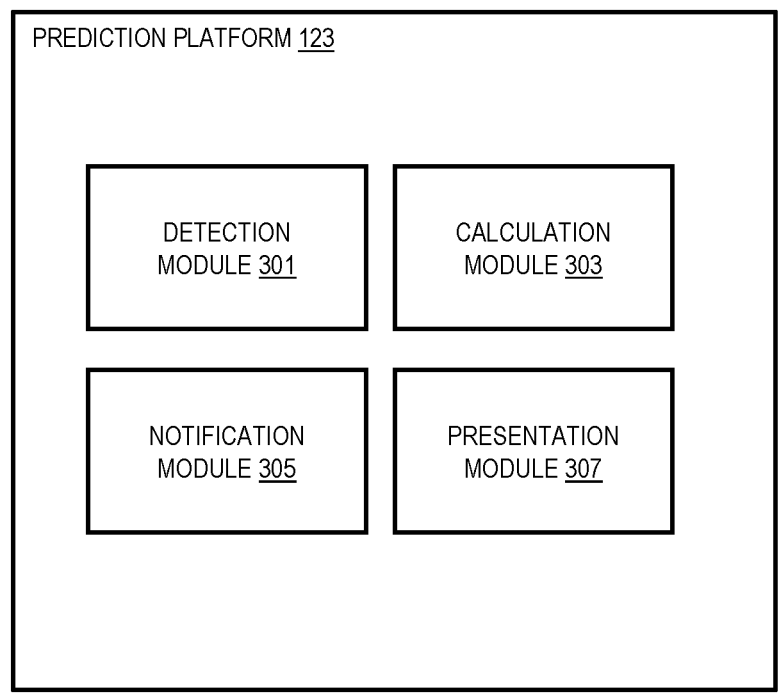
FIG. 3 illustrates a diagram of the components of the prediction platform within the system of FIG. 1.

FIG. 3 is a diagram of the components of the prediction platform 123, according to one embodiment. By way of example, the prediction platform 123 includes one or more components for providing a tire pressure analysis. It is contemplated that the functions of these components may be combined in one or more components or performed by other components of equivalent functionality. In this embodiment, the prediction platform 123 includes a detection module 301, a calculation module 303, a notification module 305, and a presentation module 307.

The detection module 301 is capable of acquiring data from the UE 101, the vehicle 105 (or one or more other vehicles similar to the vehicle 105), one or more detection entities 113, services platform 115, content providers 119, the database 125, or a combination thereof to provide a tire pressure analysis. In one embodiment, the detection module 301 acquires data indicating a tire pressure change associated with one or more vehicles for training a machine learning model to render a prediction for a cause of a tire pressure change. The data may be: (1) sensor data associated with a tire pressure change; (2) travel data of a vehicle impacted by the tire pressure change; (3) vehicle attribute data indicating one or more attributes of the vehicle impacted by the tire pressure change; (4) or a combination thereof. The sensor data may indicate one or more tire pressure levels of one or more tires of the vehicle over a predetermined period. The predetermined period may define: (1) a total amount of time elapsed for the vehicle to travel a route in which the vehicle was impacted by the tire pressure change; (2) an amount of time less than the total amount but including a period in which the vehicle was impacted by the tire pressure change; (3) the period in which the vehicle was impacted by the tire pressure change; (4) one or more lesser periods within the period in which the vehicle was impacted by the tire pressure change; or (5) a period in which a wheel of the vehicle completes a revolution and the vehicle was impacted by the tire pressure change. The sensor data may represent the one or more tire pressure levels as a function of time (e.g., tire pressure loss per minute, per second, per milli-second, etc.). The sensor data may also indicate: (1) one or more speed levels of the vehicle within the predetermined period; (2) one or more ambient temperature levels of the vehicle within the predetermined period; (3) one or more internal temperature levels of one or more tires of the vehicle within the predetermined period; (4) an amount of time elapsed starting from a time point of the latest instalment of a tire to the start of the predetermined period; (5) a total amount of distance travelled by the vehicle; (6) a total amount of distance travelled by the vehicle since the latest instalment of a tire; or (7) a combination thereof. In one embodiment, the detection module 301 may acquire certain sensor data, such as a speed of the vehicle, from one or more detection entities 113 that is proximate to the vehicle at the predetermined period. The travel data may indicate: (1) one or more road segments in which the vehicle has travelled within the predetermined period; (2) one or more road attributes of the one or more road segments; (3) one or more weather conditions that has impacted the one or more road segments; (4) whether one or more road events (e.g., road works, road accident, etc.) was impacting the one or more road segments; (5) a degree of traffic impacting the one or more road segments; (6) a season in which the predetermined period occurs; (7) a date in which the predetermined period occurs; or (8) a combination thereof. The one or more road attributes may indicate: (1) a type of road; (2) composition of a surface of the road; (3) age of the road (e.g., an amount time and days elapsed since the latest road works); (4) a number of road objects such as potholes, bumps, pavement markers, etc. within the road and locations thereof; (5) or a combination thereof. The vehicle attribute data may indicate: (1) a size of the vehicle; (2) a weight of the vehicle; (3) a make and/or model of the vehicle; (4) a classification of the vehicle; (5) a type of tire equipped by the vehicle; (6) one or more specifications associated with the vehicle or one or more functions thereof; or (7) a combination thereof.

The detection module 301 may further receive ground truth data indicating an actual observation of a cause of the tire pressure change. For example, a mechanic may review the state of a tire and provide the ground truth data through a user interface (e.g., UE 101), and the detection module 301 may receive the ground truth data. The cause of the tire pressure change may indicate a direct source causing the tire pressure change (e.g., an issue within a tire, a rim, or a valve) and a location of a source with respect to a wheel that is causing the tire pressure change. By way of example, a cause of a tire pressure change may indicate: (1) a nail or metal penetrating a tire; (2) a damaged rim; (3) a defective valve; (4) an incorrect seating of a valve within a rim; (5) an over-tightened electronic sensor cap (e.g., ignoring a proper torque thereof at approximately 4 Nm); (6) an unsealed inner layer protecting a tire (e.g., a micro-crack); (7) a damaged tire bead during installation or removal of a product on a rim; (8) dirt at a contact point of a tire bead with a flange of the rim; (9) a temperature drop in a cold weather; or (10) small punctures or cuts within the tire.

Once the machine learning model is trained, the detection module 301 may monitor the vehicle 105 to determine whether the vehicle 105 generates data indicating a tire pressure change. Such data may be generated when a rate at which the vehicle 105 loses tire pressure satisfies a threshold rate or when the vehicle 105 loses more than 5 percent of the maximum pressure of a wheel. In one embodiment, the detection module 301 may periodically receive from the vehicle 105 sensor data indicating a current tire pressure level of a wheel of the vehicle 105, and the detection module 301 may determine that the vehicle 105 is impacted by the tire pressure change based on the received sensor data. When the detection module 301 receives the data indicating the tire pressure change, detection module 301 may acquire sensor data associated with the vehicle 105, vehicle attribute data associated with the vehicle 105, and travel data associated with the vehicle 105 from the UE 101, the vehicle 105 (or one or more other vehicles similar to the vehicle 105), one or more detection entities 113, services platform 115, content providers 119, the database 125, or a combination thereof.

The calculation module 303 trains the machine learning model based on data acquired by the detection module 301. To train the machine learning model, the calculation module 303 may receive ground truth data indicating a true cause of a tire pressure change for a vehicle and generate correlation data that correlate sensor data associated with the vehicle, travel data associated with the vehicle, vehicle attribute data associated with the vehicle, or the combination thereof to the ground truth data. The sensor data, the travel data, the vehicle attribute data, the correlation data, and the ground truth data may be grouped and labelled as a tire pressure signature. Once a plurality of tire pressure signatures is acquired, the calculation module 303 provides the plurality of tire pressure signatures as an input for training the machine learning model. In one embodiment, the machine learning model may be a random forest, a logistic, a decision trees, neural networks, or a combination thereof.

When the machine learning model is trained, the calculation module 303 performs a prediction of a cause for tire pressure change associated with the vehicle 105 by receiving, via the detection module 301, sensor data of the vehicle 105 indicating all tire pressure levels recorded over a revolution period. The revolution period may be calculated by the calculation module 303 as a function of a speed of the vehicle 105 and the vehicle attribute data associated thereto that indicate a circumference of a wheel of the vehicle 105. In one embodiment, the calculation module 303 may analyze one or more pressure levels within a revolution period following a duration in which the tire pressure change is detected. In one embodiment, if the duration in which the tire pressure change is detected is greater than a revolution period, the calculation module 303 may analyze one or more pressure levels of a period within the duration. In one embodiment, the calculation module 303 may acquire a plurality of pressure levels over a plurality of revolution periods and determine an average for a single revolution period. The calculation module 303 may analyze one or more pressure levels over the revolution period to derive a pattern and/or a rate of change over the revolution period. Subsequently, the calculation module 303 may identify a tire pressure signature and a cause thereof that correspond to the derived pattern and/or rate of change. In one embodiment, the calculation module 303 may normalize sensor data acquired during the revolution period to identify a tire pressure signature corresponding to the derived pattern and/or rate of change. For example, tire pressure levels acquired during the revolution period may be normalized based on ambient temperature levels, road pavement temperature levels, atmospheric temperature levels, or a combination thereof. If the tire pressure signature is identified, the calculation module 303 may further identify a location of a source within a wheel of the vehicle 105 that is causing the tire pressure change. In one embodiment, the calculation module 303 may provide a confidence at which the derived pattern and/or rate of change indicate a predicted cause of an identified tire pressure signature and a predicted location of a source of the predicted cause. In one embodiment, the calculation module 303 may further acquire travel data and/or vehicle attribute data associated with the vehicle 105 and use the travel data and/or the vehicle attribute data to facilitate a search for at least one tire pressure signature that corresponds to the derived pattern and/or rate of change.

In one embodiment, the machine learning model may be further trained to predict a tire pressure change associated with one or more road segments based on sensor data associated with a vehicle's tire pressure change, travel data associated with the vehicle, vehicle attribute data thereof, or a combination thereof. By way of example, the machine learning model is trained to learn one or more tire pressure levels of a type of vehicle that has moved at a certain speed with a type of tire of a certain age at a road segment having certain attributes (e.g., composition of the surface thereof) and impacted by a certain weather condition. Once the machine learning model is trained and the calculation module 303 detects that the vehicle 105 is experiencing a tire pressure change, the calculation module 303 uses the machine learning model to predict an amount of tire pressure loss associated one or more road segments that the vehicle 105 is predicted to traverse. In such embodiment, the machine learning model refers to past instances in which a similar vehicle with a similar tire type has traversed the one or more road segments (or similar road segments) and lost tire pressure. Based on such instances, the machine learning model may predict an amount of tire pressure lost for traversing the one or more road segments. In one embodiment, the calculation module 303 may estimate an amount of tire pressure change based on a current rate at which the tire pressure of the vehicle 105 is changing. In one embodiment, the calculation module 303 may estimate a maximum distance a vehicle can safely travel after detecting the tire pressure change. For example, the calculation module 303 may determine it is unsafe for a vehicle to travel once the tire pressure thereof is below 25 percent of the maximum tire pressure capacity. In one embodiment, after detecting a tire pressure change, the calculation module 303 may identify a destination (e.g., the nearest auto repair shop, home, dealership, etc.) and use the machine learning model to estimate a route to the destination that yields a minimum amount of tire pressure loss.

In one embodiment, after the calculation module 303 renders a prediction for a cause of a tire pressure change, a wheel of the vehicle 105 may be inspected by a service personnel (e.g., a mechanic) to validate the actual cause of the tire pressure change. If the inspection validates the prediction, the service personnel may provide an input via the UE 101 to indicate that the prediction is true. Conversely, the service personnel may provide an input via the UE 101 to indicate that the prediction is false and provide the actual cause of the tire pressure change. In such embodiment, the calculation module 303 may receive the input and use the input to further train the calculation module 303.

The notification module 305 may generate a notification associated with a tire pressure analysis. The notification module 305 may cause the notification to the UE 101 and/or one or more other UEs associated with the vehicle 105. In such embodiment, the notification may indicate: (1) an occurrence of a tire pressure change; (2) a predicted cause of the tire pressure change; (3) a location of a source of the predicted cause; (4) an estimated maximum amount of distance the vehicle 105 can safely travel (e.g., no less than 25 percent of the maximum tire pressure) after a detection of the tire pressure change; (5) a route to a destination (e.g., the nearest auto repair shop, home, dealership, etc.) that yields a minimum amount of tire pressure loss after the detection of the tire pressure change; (6) a confidence at which the derived pattern and/or rate of change indicate a predicted cause of an identified tire pressure signature and a predicted location of a source of the predicted cause; or (7) a combination thereof. The notification may include sound notification, display notification, vibration, or a combination thereof. In one embodiment, the notification module 305 may provide the notification to a local municipality/establishment.

Figure 4:
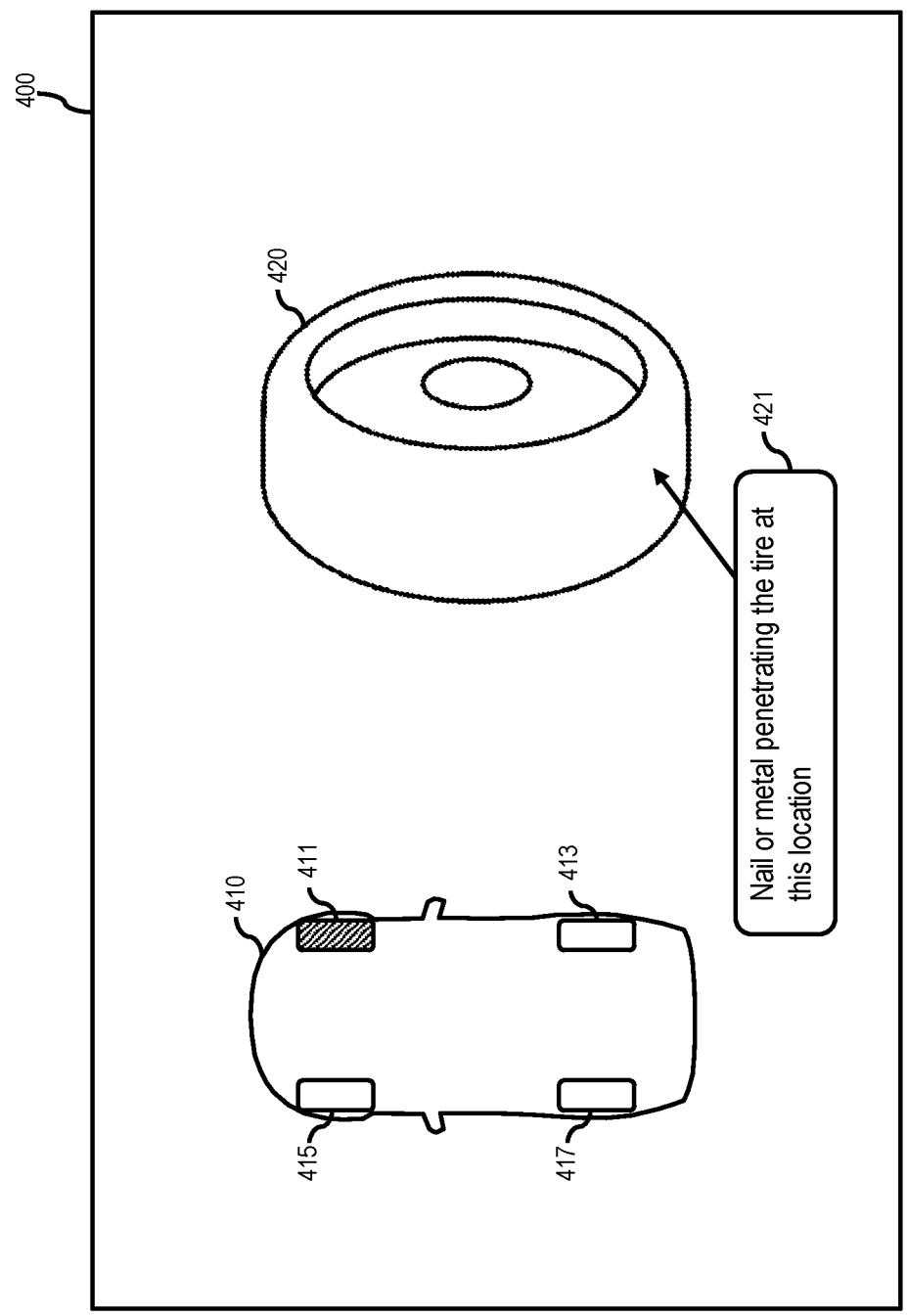
FIG. 4 illustrates a first example visual representation of a wheel among a plurality of wheels that is impacted by a tire pressure change and a location of a source that is causing the tire pressure change.
Figure 5:
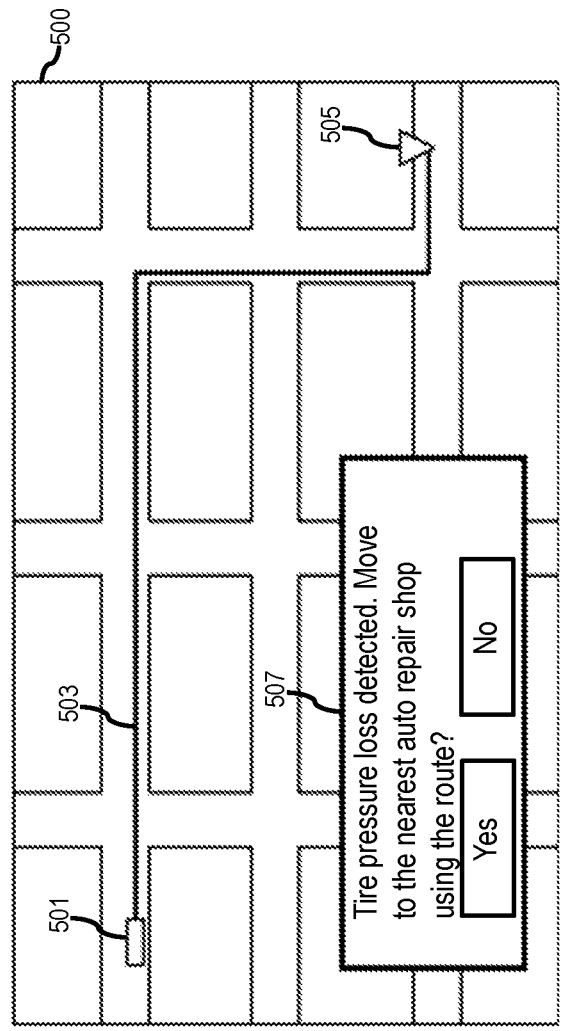
FIG. 5 illustrates a second example visual representation of a map including a route.

The presentation module 307 obtains a set of information, data, and/or calculated results from other modules, and continues with providing a presentation of a visual representation to the UE 101 and/or any other user interface associated with the vehicle 105. The visual representation may indicate any of the information presented by the notification module 305. FIG. 4 illustrates a first example visual representation 400 of a wheel among a plurality of wheels that is impacted by a tire pressure change and a location of a source that is causing the tire pressure change. The first representation 400 may be rendered by the presentation module 307. In the illustrated embodiment, the first visual representation 400 include a first model 410 of a plurality of tires of the vehicle 105 and a second model 420 of one of the plurality of tires of the vehicle 105. The first model 410 represents four wheels 411, 413, 415, and 417. In such embodiment, it is assumed that the front right tire of the vehicle 105 is impacted by a tire pressure change. As such, the wheel 411 is highlighted to indicate a detection of the tire pressure change. The second model 420 focuses on the wheel 411. The calculation module 303 predicts the cause of the tire pressure change, and the presentation module 307 generates a display 421 that indicates the cause. In the illustrated example, the display 421 states "NAIL OR METAL PENETRATING THE TIRE AT THIS LOCATION." In one embodiment, the first visual representation 400 may further indicate coordinates of an exact location of the source. For example, the coordinates may define a degree of a wheel in which the source is located, a depth in which the source is located (e.g., a point between the outermost circumference of a wheel and the central axis of the wheel), and a width of the wheel in which the source is located (e.g., a point between the inner surface of the wheel and the outer surface of the wheel). In one embodiment, the second model 420 may be interactable with a user input, thereby enabling the second model 420 to rotate in a plurality of directions to illustrate a plurality of perspective views. In one embodiment, the second model 420 may be presented such that one or more components thereof is transparent and/or semi-transparent to display a source of a tire pressure change that is within a tire. An exploded view and/or a cross-sectional view of the second model 420 is also contemplated. The visual representation 400 may further present other relevant information, such as a rate at which the wheel 411 is losing tire pressure, a maximum distance at which the vehicle 105 can safely travel, etc. FIG. 5 illustrates a second example visual representation 500 of a map including a route. The second representation 500 may be rendered by the presentation module 307. In the illustrated embodiment, the second visual representation 500 is a map including a representation 501 of the vehicle 105, a route 503, a destination 505, and a message 507. In such embodiment, it is assumed that the vehicle 105 is impacted by a tire pressure change. As such, the calculation module 303 has rendered the route 503 and the message 507, which states "TIRE PRESSURE LOSS DETECTED. MOVE TO THE NEAREST AUTO REPAIR SHOP USING THE ROUTE?" In such embodiment, the route 503 is a route that is predicted to yield a minimum amount of tire pressure loss after the detection of the tire pressure change, and the destination 505 may be the nearest auto repair shop, home, dealership, etc. In one embodiment, the second visual representation 500 may be presented as a combination of map layers including a map layer representing a predicted amount of tire pressure loss for one or more road segments and other map layers indicating other information such as road link information, segment information, node information, POI information, a type of weather affecting one or more areas, etc.

The above presented modules and components of the prediction platform 123 can be implemented in hardware, firmware, software, or a combination thereof. Though depicted as a separate entity in FIG. 3, it is contemplated that the prediction platform 123 may be implemented for direct operation by the UE 101, the vehicle 105, the services platform 115, one or more of the content providers 119, or a combination thereof. As such, the prediction platform 123 may generate direct signal inputs by way of the operating system of the UE 101, the vehicle 105, the services platform 115, the one or more of the content providers 119, of the combination thereof for interacting with the applications 103. The various executions presented herein contemplate any and all arrangements and models.

Figure 6:
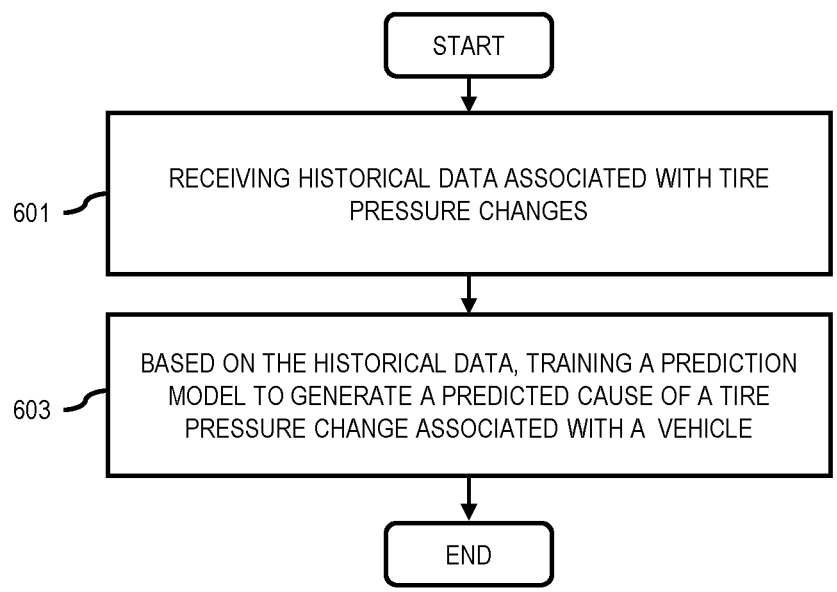
FIG. 6 illustrates a flowchart of a process for training a machine learning model to predict a cause of a tire pressure change.
Figure 9:
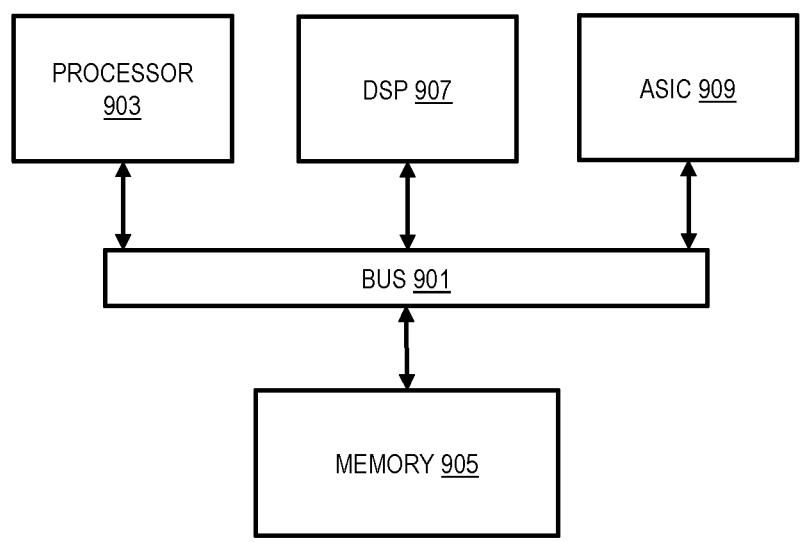
FIG. 9 illustrates a chip set or chip upon which an embodiment may be implemented.

FIG. 6 is a flowchart of a process 600 for training a machine learning model to predict a cause of a tire pressure change, according to one embodiment. In one embodiment, the prediction platform 123 performs the process 600 and is implemented in, for instance, a chip set including a processor and a memory as shown in FIG. 9.

In step 601, the prediction platform 123 receives historical data associated with a plurality of tire pressure changes. The historical data may be defined by a plurality of tire pressure signatures, where each of the plurality of tire pressure signatures includes: (1) sensor data associated with a tire pressure change; (2) travel data of a vehicle impacted by the tire pressure change; (3) vehicle attribute data indicating one or more attributes of the vehicle impacted by the tire pressure change; (4) ground truth data indicating a true cause of the tire pressure change; and (5) correlation data correlating the cause to the sensor data, travel data, and the vehicle attribute data. The sensor data may indicate one or more tire pressure levels over a period in which a wheel of the vehicle completes a revolution.

In step 603, the prediction platform 123 trains a prediction model to generate a predicted cause of a tire pressure change associated with a vehicle based on the historical data. The predicted cause may indicate a source of the cause and the location thereof. The predicted cause may indicate: (1) a nail or metal penetrating a tire; (2) a damaged rim; (3) a defective valve; (4) an incorrect seating of a valve in a rim; (5) an over-tightened electronic sensor cap (e.g., ignoring a proper torque thereof at approximately 4 Nm); (6) an unsealed inner layer protecting a tire (i.e., a micro-crack); (7) a damaged tire bead during installation or removal of a product on a rim; (8) dirt at a contact point of a tire bead with flange of the rim; (9) a temperature drop in a cold weather; or (10) small punctures or cuts within the tire.

Figure 7:
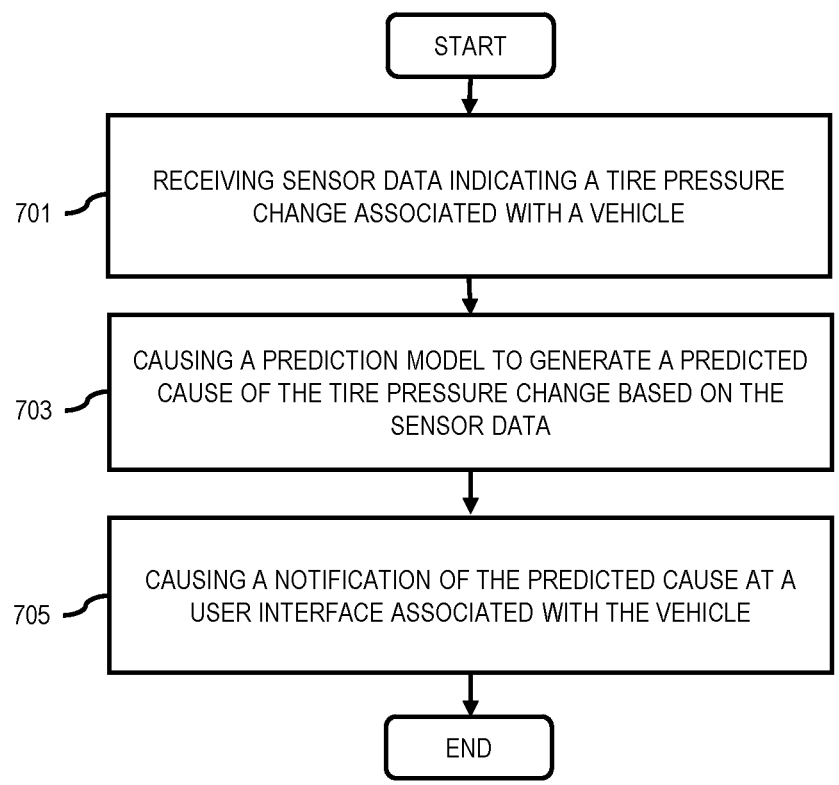
FIG. 7 illustrates a flowchart of a process for causing a notification of a predicted cause of a tire pressure change.

FIG. 7 is a flowchart of a process 700 for causing a notification of a predicted cause of a tire pressure change. In one embodiment, the prediction platform 123 performs the process 700 and is implemented in, for instance, a chip set including a processor and a memory as shown in FIG. 9.

In step 701, the prediction platform 123 receives sensor data indicating a tire pressure change associated with a vehicle. The sensor data may indicate one or more tire pressure levels over a period in which a wheel of the vehicle completes a revolution (i.e., the revolution period). The revolution period may be subsequent to a period in which the tire pressure change is detected. Alternatively, the revolution period may be within the period in which the tire pressure change is detected. In one embodiment, the prediction platform 123 further acquires travel data associated with the vehicle and/or vehicle attribute data indicating one or more attributes of the vehicle impacted by the tire pressure change.

In step 703, the prediction platform 123 causes a prediction model to generate a predicted cause of the tire pressure change based on the sensor data. The prediction model may be trained based on historical data defining a plurality of tire pressure signatures, where each of the plurality of tire pressure signatures includes: (1) sensor data associated with a tire pressure change; (2) travel data of a vehicle impacted by the tire pressure change; (3) vehicle attribute data indicating one or more attributes of the vehicle impacted by the tire pressure change; (4) ground truth data indicating a true cause of the tire pressure change; and (5) correlation data correlating the cause to the sensor data, travel data, and the vehicle attribute data. The prediction platform 123 may analyze the sensor data to derive a pattern and/or a rate of change over the revolution period. Subsequently, the prediction platform 123 may identify a tire pressure signature and a cause that correspond to the derived pattern and/or rate of change. In one embodiment, the prediction platform 123 may use the travel data and/or the vehicle attribute data to facilitate a search for a tire pressure signature and a cause that corresponds to the derived pattern and/or rate of change.

In step 705, the prediction platform 123 causes a notification of the predicted cause at a user interface associated with the vehicle. For example, the user interface may be the UE 101 or any other UE associated with the vehicle. In one embodiment, the notification may further include a source of a cause of the tire pressure change and a location thereof.

The system, apparatus, and methods described herein enable a map-based server/platform to predict a cause of a tire pressure change, thereby enabling a vehicle operator and/or an auto repair personnel to quickly identify the cause and remedy the source of the tire pressure change. Further, since the map-based server/platform is capable of informing a user regarding a maximum amount of distance that a vehicle can safely travel subsequent to detecting a tire pressure change associated with the vehicle, the user may have the confidence for reaching the desired destination thereof.

The processes described herein may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 8:
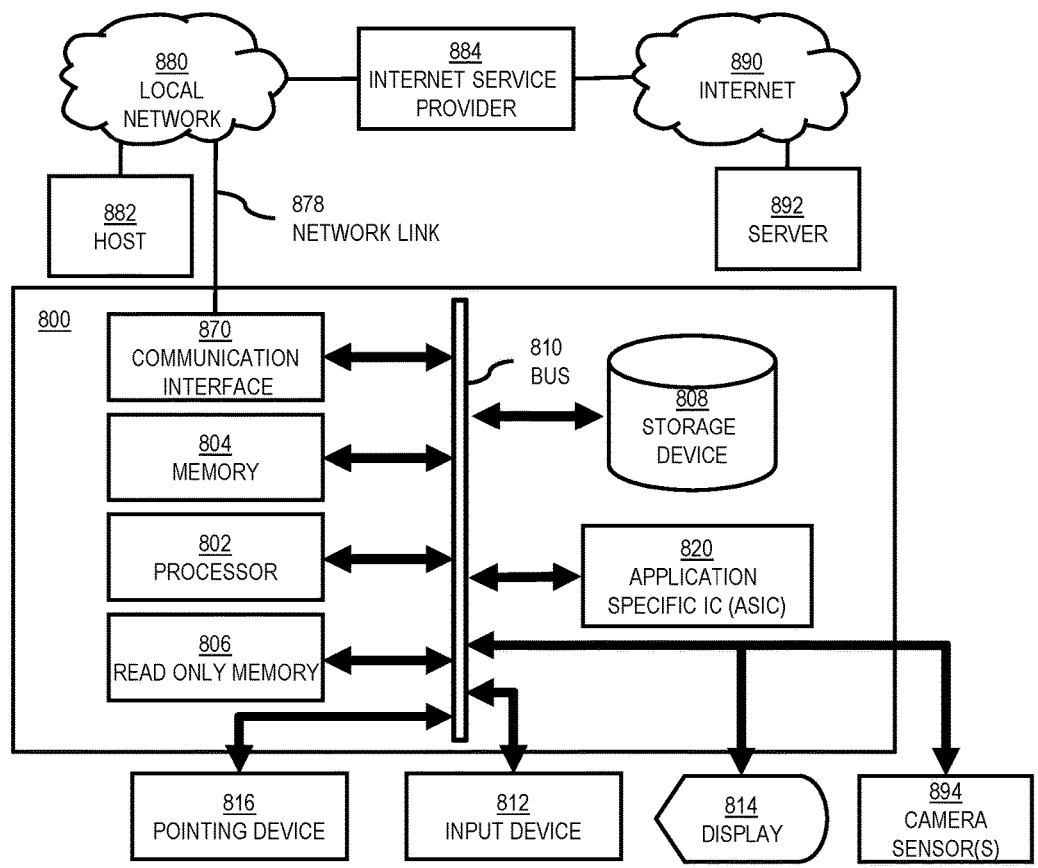
FIG. 8 illustrates a computer system upon which an embodiment may be implemented.

FIG. 8 illustrates a computer system 800 upon which an embodiment may be implemented. Although computer system 800 is depicted with respect to a particular device or equipment, it is contemplated that other devices or equipment (e.g., network elements, servers, etc.) within FIG. 8 can deploy the illustrated hardware and components of system 800. Computer system 800 is programmed (e.g., via computer program code or instructions) to provide a tire pressure analysis, as described herein and includes a communication mechanism such as a bus 810 for passing information between other internal and external components of the computer system 800. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 800, or a portion thereof, constitutes a means for providing a tire pressure analysis.

A bus 810 includes one or more parallel conductors of information so that information is transferred quickly among devices coupled to the bus 810. One or more processors 802 for processing information are coupled with the bus 810.

A processor (or multiple processors) 802 performs a set of operations on information as specified by computer program code related to providing a tire pressure analysis. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 810 and placing information on the bus 810. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 802, such as a sequence of operation codes, constitute processor instructions, also called computer system instructions or, simply, computer instructions. Processors may be implemented as mechanical, electrical, magnetic, optical, chemical, or quantum components, among others, alone or in combination.

Computer system 800 also includes a memory 804 coupled to bus 810. The memory 804, such as a random access memory (RAM) or any other dynamic storage device, stores information including processor instructions for providing a tire pressure analysis. Dynamic memory allows information stored therein to be changed by the computer system 800. RAM allows a unit of information stored at a location called a memory address to be stored and retrieved independently of information at neighboring addresses. The memory 804 is also used by the processor 802 to store temporary values during execution of processor instructions. The computer system 800 also includes a read only memory (ROM) 806 or any other static storage device coupled to the bus 810 for storing static information, including instructions, that is not changed by the computer system 800. Some memory is composed of volatile storage that loses the information stored thereon when power is lost. Also coupled to bus 810 is a non-volatile (persistent) storage device 808, such as a magnetic disk, optical disk or flash card, for storing information, including instructions, that persists even when the computer system 800 is turned off or otherwise loses power.

Information, including instructions for providing a tire pressure analysis, is provided to the bus 810 for use by the processor from an external input device 812, such as a keyboard containing alphanumeric keys operated by a human user, a microphone, an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 800. Other external devices coupled to bus 810, used primarily for interacting with humans, include a display device 814, such as a cathode ray tube (CRT), a liquid crystal display (LCD), a light emitting diode (LED) display, an organic LED (OLED) display, a plasma screen, or a printer for presenting text or images, and a pointing device 816, such as a mouse, a trackball, cursor direction keys, or a motion sensor, for controlling a position of a small cursor image presented on the display 814 and issuing commands associated with graphical elements presented on the display 814, and one or more camera sensors 894 for capturing, recording and causing to store one or more still and/or moving images (e.g., videos, movies, etc.) which also may comprise audio recordings. In some embodiments, for example, in embodiments in which the computer system 800 performs all functions automatically without human input, one or more of external input device 812, display device 814 and pointing device 816 may be omitted.

In the illustrated embodiment, special purpose hardware, such as an application specific integrated circuit (ASIC) 820, is coupled to bus 810. The special purpose hardware is configured to perform operations not performed by processor 802 quickly enough for special purposes. Examples of ASICs include graphics accelerator cards for generating images for display 814, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 800 also includes one or more instances of a communications interface 870 coupled to bus 810. Communication interface 870 provides a one-way or two-way communication coupling to a variety of external devices that operate with their own processors, such as printers, scanners and external disks. In general, the coupling is with a network link 878 that is connected to a local network 880 to which a variety of external devices with their own processors are connected. For example, communication interface 870 may be a parallel port or a serial port or a universal serial bus (USB) port on a personal computer. In some embodiments, communications interface 870 is an integrated services digital network (ISDN) card or a digital subscriber line (DSL) card or a telephone modem that provides an information communication connection to a corresponding type of telephone line. In some embodiments, a communication interface 870 is a cable modem that converts signals on bus 810 into signals for a communication connection over a coaxial cable or into optical signals for a communication connection over a fiber optic cable. As another example, communications interface 870 may be a local area network (LAN) card to provide a data communication connection to a compatible LAN, such as Ethernet. Wireless links may also be implemented. For wireless links, the communications interface 870 sends or receives or both sends and receives electrical, acoustic or electromagnetic signals, including infrared and optical signals, that carry information streams, such as digital data. For example, in wireless handheld devices, such as mobile telephones like cell phones, the communications interface 870 includes a radio band electromagnetic transmitter and receiver called a radio transceiver.

The term "computer-readable medium" as used herein refers to any medium that participates in providing information to processor 802, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 808. Volatile media include, for example, dynamic memory 804. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 820.

Network link 878 typically provides information communication using transmission media through one or more networks to other devices that use or process the information. For example, network link 878 may provide a connection through local network 880 to a host computer 882 or to equipment 884 operated by an Internet Service Provider (ISP). ISP equipment 884 in turn provides data communication services through the public, world-wide packet-switching communication network of networks now commonly referred to as the Internet 890.

A server 892 connected to the Internet 890 hosts a process that provides a service in response to information received over the Internet 890. For example, a server 892 hosts a process that provides information representing video data for presentation at display 814. It is contemplated that the components of system 800 can be deployed in various configurations within other computer systems, e.g., host 882.

At least some embodiments of the invention are related to the use of computer system 800 for implementing some or all of the techniques described herein. According to one embodiment of the invention, those techniques are performed by computer system 800 in response to processor 802 executing one or more sequences of one or more processor instructions contained in memory 804. Such instructions, also called computer instructions, software and program code, may be read into memory 804 from another computer-readable medium such as storage device 808 or network link 878. Execution of the sequences of instructions contained in memory 804 causes processor 802 to perform one or more of the method steps described herein. In alternative embodiments, hardware, such as ASIC 820, may be used in place of or in combination with software to implement the invention. Thus, embodiments of the invention are not limited to any specific combination of hardware and software, unless otherwise explicitly stated herein.

The signals transmitted over network link 878 and other networks through communications interface 870, carry information to and from computer system 800. Computer system 800 can send and receive information, including program code, through the networks 880, network link 878, and communications interface 870. In an example using the Internet 890, a server 892 transmits program code for a particular application, requested by a message sent from computer 800, through Internet 890, ISP equipment 884, local network 880 and communications interface 870. The received code may be executed by processor 802 as it is received or may be stored in memory 804 or in storage device 808 or any other non-volatile storage for later execution, or both. In this manner, computer system 800 may obtain application program code in the form of signals on a carrier wave.

Various forms of computer readable media may be involved in carrying one or more sequence of instructions or data or both to processor 802 for execution. For example, instructions and data may initially be carried on a magnetic disk of a remote computer such as host 882. The remote computer loads the instructions and data into its dynamic memory and sends the instructions and data over a telephone line using a modem. A modem local to the computer system 800 receives the instructions and data on a telephone line and uses an infra-red transmitter to convert the instructions and data to a signal on an infra-red carrier wave serving as the network link 878. An infrared detector serving as communications interface 870 receives the instructions and data carried in the infrared signal and places information representing the instructions and data onto bus 810. Bus 810 carries the information to memory 804 from which processor 802 retrieves and executes the instructions using some of the data sent with the instructions. The instructions and data received in memory 804 may optionally be stored on storage device 808, either before or after execution by the processor 802.

FIG. 9 illustrates a chip set or chip 900 upon which an embodiment may be implemented. Chip set 900 is programmed to provide a tire pressure analysis as described herein and includes, for instance, the processor and memory components described with respect to FIG. 9 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 900 can be implemented in a single chip. It is further contemplated that in certain embodiments the chip set or chip 900 can be implemented as a single "system on a chip." It is further contemplated that in certain embodiments a separate ASIC would not be used, for example, and that all relevant functions as disclosed herein would be performed by a processor or processors. Chip set or chip 900, or a portion thereof, constitutes a means for performing one or more steps of providing user interface navigation information associated with the availability of functions. Chip set or chip 900, or a portion thereof, constitutes a means for providing a tire pressure analysis.

In one embodiment, the chip set or chip 900 includes a communication mechanism such as a bus 901 for passing information among the components of the chip set 900. A processor 903 has connectivity to the bus 901 to execute instructions and process information stored in, for example, a memory 905. The processor 903 may include one or more processing cores with each core configured to perform independently. A multi-core processor enables multiprocessing within a single physical package. Examples of a multi-core processor include two, four, eight, or greater numbers of processing cores. Alternatively or in addition, the processor 903 may include one or more microprocessors configured in tandem via the bus 901 to enable independent execution of instructions, pipelining, and multithreading. The processor 903 may also be accompanied with one or more specialized components to perform certain processing functions and tasks such as one or more digital signal processors (DSP) 907, or one or more application-specific integrated circuits (ASIC) 909. A DSP 907 typically is configured to process real-world signals (e.g., sound) in real time independently of the processor 903. Similarly, an ASIC 909 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 900 includes merely one or more processors and some software and/or firmware supporting and/or relating to and/or for the one or more processors. The processor 903 and accompanying components have connectivity to the memory 905 via the bus 901. The memory 905 includes both dynamic memory (e.g., RAM, magnetic disk, writable optical disk, etc.) and static memory (e.g., ROM, CD-ROM, etc.) for storing executable instructions that when executed perform the inventive steps described herein to provide a tire pressure analysis. The memory 905 also stores the data associated with or generated by the execution of the inventive steps.

Figure 10:
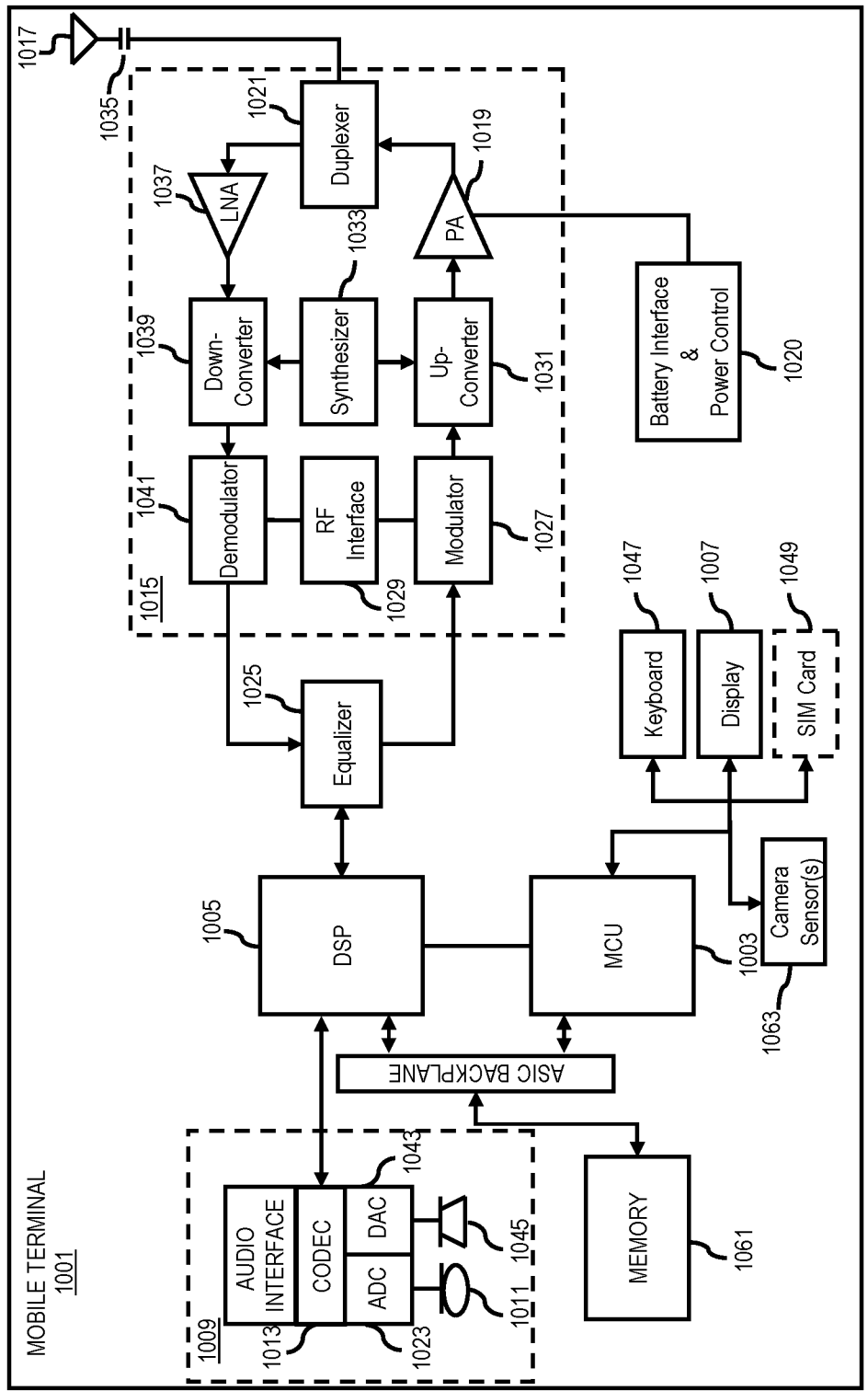
FIG. 10 illustrates a diagram of exemplary components of a mobile terminal for communications, which is capable of operating in the system of FIG. 1.

FIG. 10 is a diagram of exemplary components of a mobile terminal 1001 (e.g., a mobile device or vehicle or part thereof) for communications, which is capable of operating in the system of FIG. 1, according to one embodiment. In some embodiments, mobile terminal 1001, or a portion thereof, constitutes a means for providing a tire pressure analysis. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover, if applicable, to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1003, a Digital Signal Processor (DSP) 1005, and a receiver/transmitter unit including a microphone gain control unit and a speaker gain control unit. A main display unit 1007 provides a display to the user in support of various applications and mobile terminal functions that perform or support the steps of providing a tire pressure analysis. The display 1007 includes display circuitry configured to display at least a portion of a user interface of the mobile terminal (e.g., mobile telephone). Additionally, the display 1007 and display circuitry are configured to facilitate user control of at least some functions of the mobile terminal. An audio function circuitry 1009 includes a microphone 1011 and microphone amplifier that amplifies the speech signal output from the microphone 1011. The amplified speech signal output from the microphone 1011 is fed to a coder/decoder (CODEC) 1013.

A radio section 1015 amplifies power and converts frequency in order to communicate with a base station, which is included in a mobile communication system, via antenna 1017. The power amplifier (PA) 1019 and the transmitter/modulation circuitry are operationally responsive to the MCU 1003, with an output from the PA 1019 coupled to the duplexer 1021 or circulator or antenna switch, as known in the art. The PA 1019 also couples to a battery interface and power control unit 1020.

In use, a user of mobile terminal 1001 speaks into the microphone 1011 and his or her voice along with any detected background noise is converted into an analog voltage. The analog voltage is then converted into a digital signal through the Analog to Digital Converter (ADC) 1023. The control unit 1003 routes the digital signal into the DSP 1005 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, 5G networks, code division multiple access (CDMA), wideband code division multiple access (WCDMA), wireless fidelity (WiFi), satellite, and the like, or any combination thereof.

The encoded signals are then routed to an equalizer 1025 for compensation of any frequency-dependent impairments that occur during transmission though the air such as phase and amplitude distortion. After equalizing the bit stream, the modulator 1027 combines the signal with a RF signal generated in the RF interface 1029. The modulator 1027 generates a sine wave by way of frequency or phase modulation. In order to prepare the signal for transmission, an up-converter 1031 combines the sine wave output from the modulator 1027 with another sine wave generated by a synthesizer 1033 to achieve the desired frequency of transmission. The signal is then sent through a PA 1019 to increase the signal to an appropriate power level. In practical systems, the PA 1019 acts as a variable gain amplifier whose gain is controlled by the DSP 1005 from information received from a network base station. The signal is then filtered within the duplexer 1021 and optionally sent to an antenna coupler 1035 to match impedances to provide maximum power transfer. Finally, the signal is transmitted via antenna 1017 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 1001 are received via antenna 1017 and immediately amplified by a low noise amplifier (LNA) 1037. A down-converter 1039 lowers the carrier frequency while the demodulator 1041 strips away the RF leaving only a digital bit stream. The signal then goes through the equalizer 1025 and is processed by the DSP 1005. A Digital to Analog Converter (DAC) 1043 converts the signal and the resulting output is transmitted to the user through the speaker 1045, all under control of a Main Control Unit (MCU) 1003 which can be implemented as a Central Processing Unit (CPU).

The MCU 1003 receives various signals including input signals from the keyboard 1047. The keyboard 1047 and/or the MCU 1003 in combination with other user input components (e.g., the microphone 1011) comprise a user interface circuitry for managing user input. The MCU 1003 runs a user interface software to facilitate user control of at least some functions of the mobile terminal 1001 to provide a tire pressure analysis. The MCU 1003 also delivers a display command and a switch command to the display 1007 and to the speech output switching controller, respectively. Further, the MCU 1003 exchanges information with the DSP 1005 and can access an optionally incorporated SIM card 1049 and a memory 1061. In addition, the MCU 1003 executes various control functions required of the terminal. The DSP 1005 may, depending upon the implementation, perform any of a variety of conventional digital processing functions on the voice signals. Additionally, DSP 1005 determines the background noise level of the local environment from the signals detected by microphone 1011 and sets the gain of microphone 1011 to a level selected to compensate for the natural tendency of the user of the mobile terminal 1001.

The CODEC 1013 includes the ADC 1023 and DAC 1043. The memory 1061 stores various data including call incoming tone data and is capable of storing other data including music data received via, e.g., the global Internet. The software module could reside in RAM memory, flash memory, registers, or any other form of writable storage medium known in the art. The memory device 1051 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 1049 carries, for instance, important information, such as the cellular phone number, the carrier supplying service, subscription details, and security information. The SIM card 1049 serves primarily to identify the mobile terminal 1001 on a radio network. The card 1049 also contains a memory for storing a personal telephone number registry, text messages, and user specific mobile terminal settings.

Further, one or more camera sensors 1063 may be incorporated onto the mobile station 1001 wherein the one or more camera sensors may be placed at one or more locations on the mobile station. Generally, the camera sensors may be utilized to capture, record, and cause to store one or more still and/or moving images (e.g., videos, movies, etc.) which also may comprise audio recordings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

We claim:

1. An apparatus comprising at least one processor and at least one non-transitory memory including computer program code instructions, the computer program code instructions configured to, when executed, cause the apparatus to:
    receive historical data, the historical data including a plurality of tire pressure signatures, wherein each of the plurality of tire pressure signatures includes correlation data that correlates a cause of a first tire pressure change associated with a first vehicle to first sensor data indicating one or more tire pressure levels of the first vehicle, wherein the correlation data correlates the cause to travel data associated with the first vehicle, wherein the travel data indicate one or more attributes of a road segment on which the first vehicle was traversing, and wherein the one or more attributes indicate: (i) whether the road segment includes one or more pot holes; (ii) whether the road segment include one or more speed bumps; and (iii) whether a surface of the road segment is paved or unpaved;
    based on the historical data, train a prediction model to generate a predicted cause of a second tire pressure change associated with a second vehicle;
    receive second sensor data indicating the second tire pressure change;
    cause the prediction model to generate the predicted cause of the second tire pressure change associated with the second vehicle;
    determine a route to a destination based on the second tire pressure change;
    cause a user interface of an in-vehicle navigation system of the second vehicle to output the predicted cause; and
    cause the second vehicle to traverse the route.

2. The apparatus of claim 1, wherein the first sensor data indicate one or more speed levels, the one or more speed levels being associated with the first vehicle.

3. The apparatus of claim 1, wherein the travel data indicate whether the first vehicle was traversing one or more road segments impacted by roadwork.

4. The apparatus of claim 1, wherein the travel data indicate a season.

5. The apparatus of claim 1, wherein the travel data indicate a date.

6. The apparatus of claim 1, wherein the travel data indicate: (i) a first total amount of distance traveled by the first vehicle; (ii) a second total amount of distance covered by the wheel; or (iii) a combination thereof.

7. The apparatus of claim 1, wherein the cause indicates: (i) a type of source that directly caused the first tire pressure change; (ii) a location of the source with respect to the wheel; (iii) or a combination thereof.

8. The apparatus of claim 1, wherein the correlation data correlates the cause to one or more attributes of the first vehicle, the one or more attributes indicating: (i) a size; (ii) a make; (iii) a model; (iv) a weight; (v) a classification; (vi) or (vii) a combination thereof.

9. The apparatus of claim 1, wherein the historical data indicate an amount of tire pressure loss associated with the first vehicle for an event in which the first vehicle traversed one or more first road segments, and wherein the computer program code instructions are configured to, when executed, cause the apparatus to, based on the historical data, train the prediction model to generate a predicted amount of tire pressure loss for the second vehicle to traverse one or more second road segments.

10. A non-transitory computer-readable storage medium having computer program code instructions stored therein, the computer program code instructions, when executed by at least one processor, cause the at least one processor to:
receive first sensor data indicating a first tire pressure change associated with a first vehicle;
cause a prediction model to generate a predicted cause of the first tire pressure change based on the first sensor data, wherein the prediction model is trained based on historical data, the historical data including a plurality of tire pressure signatures, wherein each of the plurality of tire pressure signatures includes correlation data that correlates a cause of a second tire pressure change associated with a second vehicle to second sensor data indicating one or more tire pressure levels of the second vehicle, wherein the correlation data correlates the cause to travel data associated with the second vehicle, wherein the travel data indicate one or more attributes of a road segment on which the second vehicle was traversing, and wherein the one or more attributes indicate: (i) whether the road segment includes one or more pot holes; (ii) whether the road segment include one or more speed bumps; and (iii) whether a surface of the road segment is paved or unpaved;
determine a route to a destination based on the first tire pressure change;
cause a user interface of an in-vehicle navigation system of the first vehicle to output the predicted cause; and
cause the first vehicle to traverse the route.

11. The non-transitory computer-readable storage medium of claim 10, wherein the historical data indicate an amount of tire pressure loss associated with the second vehicle for an event in which the second vehicle traversed one or more first road segments, and wherein the computer program code instructions, when executed by the at least one processor, cause the at least one processor to, responsive to receiving the first sensor data indicating the first tire pressure change, cause the prediction model to generate a predicted amount of tire pressure loss for the first vehicle to traverse one or more second road segments.

12. A method comprising:
receiving historical data, the historical data including a plurality of tire pressure signatures, wherein each of the plurality of tire pressure signatures includes correlation data that correlates a cause of a first tire pressure change associated with a first vehicle to first sensor data indicating one or more tire pressure levels of the first vehicle, wherein the correlation data correlates the cause to travel data associated with the first vehicle, wherein the travel data indicate one or more attributes of a road segment on which the first vehicle was traversing, and wherein the one or more attributes indicate: (i) whether the road segment includes one or more pot holes; (ii) whether the road segment include one or more speed bumps; and (iii) whether a surface of the road segment is paved or unpaved;
based on the historical data, training a prediction model to generate a predicted cause of a second tire pressure change associated with a second vehicle;
receiving second sensor data indicating the second tire pressure change;
causing the prediction model to generate the predicted cause of the second tire pressure change associated with the second vehicle;
determining a route to a destination based on the second tire pressure change;
cause a user interface of an in-vehicle navigation system of the second vehicle to output the predicted cause; and
cause the second vehicle to traverse the route.

* * * * *